United States Patent [19]
Ishizuka et al.

[11] Patent Number: 6,101,391
[45] Date of Patent: Aug. 8, 2000

[54] MOBILE TELEPHONE SYSTEM WHICH SENDS A MOBILE'S POSITIONAL DATA TO CERTAIN NEARBY MOBILES

[75] Inventors: Seijiro Ishizuka, Tokyo; Masatoshi Kozera, Kanagawa, both of Japan

[73] Assignee: Sony Corporation, Tokyo, Japan

[21] Appl. No.: 09/031,688

[22] Filed: Feb. 27, 1998

[30] Foreign Application Priority Data

Mar. 11, 1997 [JP] Japan ................................. 9-055717

[51] Int. Cl.$^7$ ........................................ H04Q 7/22

[52] U.S. Cl. ........................ 455/457; 455/566; 455/414; 455/518

[58] Field of Search .................... 455/456, 457, 455/440, 518, 519, 566, 422, 414; 342/367, 357.01, 357.1

[56] References Cited

U.S. PATENT DOCUMENTS 5,515,426  5/1996  Yacenda et al. ................. 455/456 X
5,873,041  2/1999  Ishii .............................. 455/457

*Primary Examiner*—Fan Tsang
*Assistant Examiner*—Philip J. Sobutka
*Attorney, Agent, or Firm*—Jay H. Maioli

[57] ABSTRACT

A base station calculates distances to respective mobile stations and transmits the distances, and a control station determines positions of respective mobile stations based on the distances between plural base stations and respective mobile stations. The control station previously stores the same identification code for specific plural mobile stations, and examines whether or not any other mobile station having the same identification code exists within a range scale designated by one of the specific plural mobile stations, and then gives notice of the search result to one of specific plural mobile stations via the base station.

16 Claims, 6 Drawing Sheets

MOBILE TELEPHONE SYSTEM WHICH SENDS A MOBILE'S POSITIONAL DATA TO CERTAIN NEARBY MOBILES

BACKGROUND OF THE INVENTION

1. Field of the Invention

This invention is relates to a mobile communication system and a mobile communication terminal, and more particularly, suitably applied to a digital cellular system in a code division multiple access (CDMA) system.

2. Description of the Related Art

A digital cellular system is comprised of a mobile terminal and plural base stations, and constructs a so-called wide area communication system. The mobile terminal radios with the plural base stations, thereby communicating with a public telephone or another mobile telephone in the form of a voice or the like, via a wire circuit or a radio circuit which is connected with the base station.

The plural base stations transmit and receive radio waves under a predetermined radio communication system, and mediate between call-out from the mobile terminal and call-in to the mobile terminal. Besides, the base station periodically transmits its own identification signal so that the mobile terminal can recognize the base station, and moreover periodically transmits an adjacentstation signal which is an identification signal of the adjacent base station.

That is, the mobile terminal receives the adjacent-station signal together with the identification signal of the base station by receiving signals sent from the base station while moving. Since the reception sensibility of a radio wave lowers as the mobile terminal departs from the service area of the base station, the mobile terminal examines the reception sensibility of the radio wave of the adjacent base station which is included in the adjacent-station signal, in preparation for hand-off. As a result, when the radio wave of the adjacent base station has become so strong as to be received satisfactorily, the mobile terminal performs hand-off toward the adjacent base station, so that it can continue talking while moving.

By the way, the mobile terminal having the aforementioned structure can continue talking while moving at high speed by performing hand-off among plural base stations while moving. A global positioning system (GPS), one of various known navigation systems, to obtain positional information by utilizing radio waves which are emitted from an artificial satellite is used as a system for determining the absolute position of the mobile terminal at that time. In this case, by combining the GPS with the mobile terminal, it is enabled to determine the absolute position of the mobile terminal. However, since this case requires to install an antenna and a receiver in addition, there have been problems in that the system is enlarged in size as a whole and so it has poor handiness.

On the other hand, since the simple-type mobile telephone system called a personal handyphone system (PHS) has a small service area of about 100 [m] to 300 [m] in comparison with the fact that the service area of the mobile telephone system is about 1.5 [km] to several kilometers, if the PHS base station side gives notice of the positional information of the PHS base station which is communicating with the mobile terminal, the mobile terminal side can know that to which PHS base station it is connected. However, there has been such a problem that though the user can recognize that his mobile terminal is staying within the small service area of the PHS base station, the recognition has an error outside of about 100 [m] to 300 [m].

Besides, there have been problems in that the mobile terminal does not have the real-time paging function for performing transmission of letter information, etc. among the mobile terminals and transmission of a response signal from the side which has received the letter information, and is not able to perform two-way communications.

SUMMARY OF THE INVENTION

In view of the foregoing, an object of this invention is to provide a communication system and a mobile communication terminal in which the current position of the mobile terminal can be easily recognized.

The foregoing object and other objects of the invention have been achieved by the provision of a mobile communication system including plural base stations which are synchronized with each other, a control station for performing general administration of the base stations, and plural mobile stations, in which each of the plural base stations comprises distance calculating means for calculating distances between the base station and the respective plural mobile stations on the basis of a signal transmission velocity and a signal transmission time obtained by communicating with the respective plural mobile stations, and the control station comprises position determining means for determining positions of the respective mobile stations based on distances, which are sent from the plural base stations, between the respective base stations and the respective mobile stations, storing means for storing the same identification code for specific plural mobile stations out of the plural mobile stations, and notifying means for examining whether or not any other mobile station having the same identification code exists within a range scale designated by one of the specific plural mobile stations and for giving notice of the search result to one of the specific plural mobile stations via the base station.

Accordingly, the mobile station can easily recognize the positions of the other mobile stations having the same identification code on the basis of the search result.

Besides, in the case where any other mobile station having the same identification code exists within the range scale designated by the mobile station, the notifying means gives notice of the telephone number of the other mobile station as the search result, so that the user can recognize that the owner of the telephone number exists within the designated range scale.

Besides, in response to a request from the mobile station, the notifying means notifies other mobile stations having the same identification code of the absolute positional information of the mobile station, so that it is able to make the other mobile stations recognize the absolute position of the mobile station.

The nature, principle and utility of the invention will become more apparent from the following detailed description when read in conjunction with the accompanying drawings in which like parts are designated by like reference numerals or characters.

BRIEF DESCRIPTION OF THE EMBODIMENT

DETAILED DESCRIPTION OF THE EMBODIMENT

Figure 1:
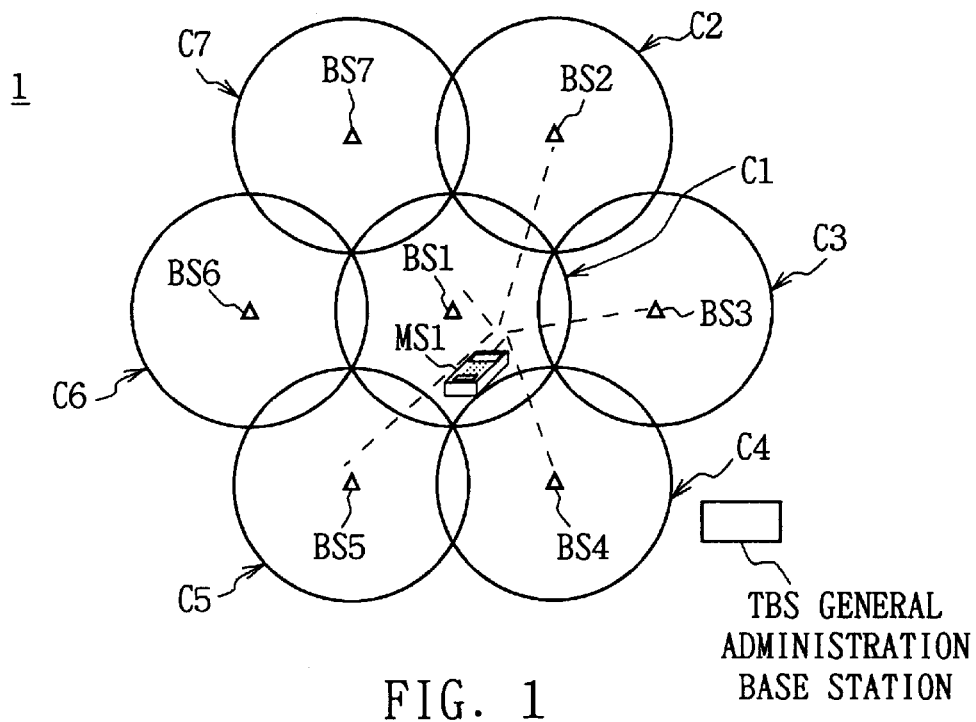
FIG. 1 is a schematic diagram showing a communication system according to an embodiment of the present invention.

Preferred embodiments of this invention will be described with reference to the accompanying drawings:

In FIG. 1, numeral 1 shows a CDMA-mode communication system according to the present invention and is comprised of plural base stations BS1 to BS7, a mobile terminal MS1, and a general administration base station TBS. In the communication system 1, the plural base stations BS1 to BS7 are mutually spaced with stated spaces and an area for the mobile communication is entirely covered with cells (service areas) C1 to C7 of the respective base stations BS1 to BS7, so that the wide area communication can be performed with the mobile terminal MS1 which is existing within the area.

Accordingly, since the mobile terminal MS1 can be handed over if it is within the cells C1 to C7 of the respective base stations BS1 to BS7, the reception condition for radio wave does not become [out of the area], so that the mobile communication is always possible. Besides, the general administration base station TBS has the function of a switching center, and performs general administration of the plural base stations BS1 to BS7 and moreover, stores absolute positional information of the mobile terminal MS1.

Figure 2:
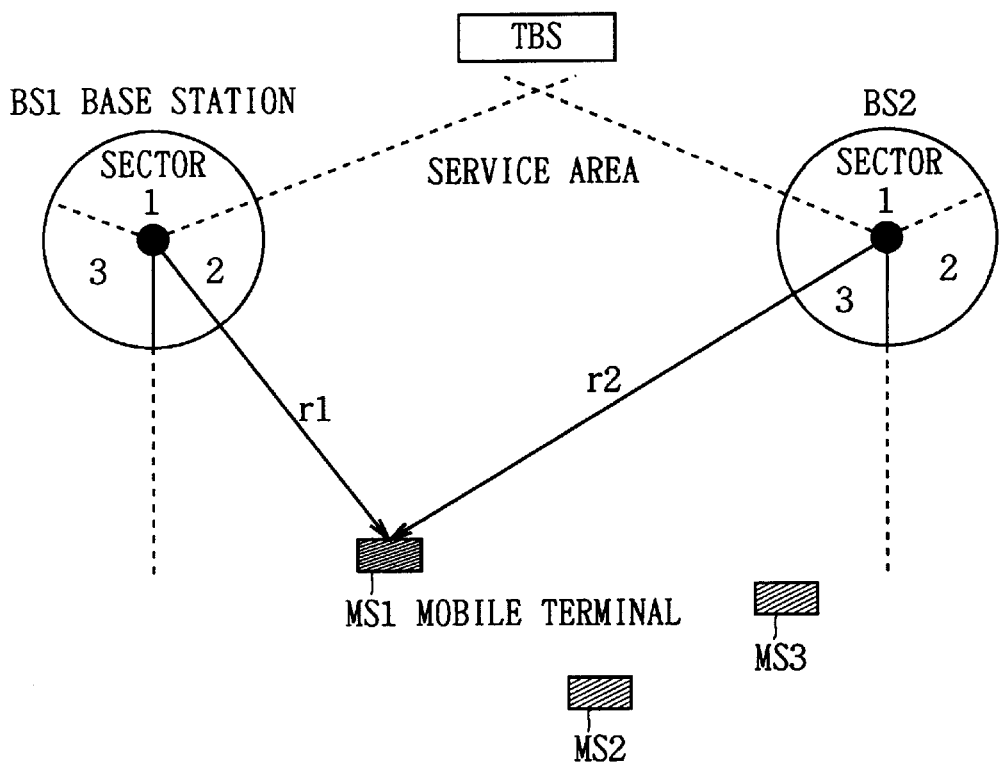
FIG. 2 is a schematic diagram showing the positions of the mobile terminals in the sectors of the base stations.

As shown in FIG. 2, in the communication system 1 of the present invention, the mobile terminal MS1 can obtain the current positional information of itself from the general administration base station TBS via the base station BS1 or the base station BS2. In fact, the base stations BS1 and BS2 measure respective distances r1 and r2 from the base stations to the mobile terminal MS1, and then transmit the distance information (r1 and r2) to the general administration base station TBS. The general administration base station TBS specifies the absolute position of the mobile terminal MS1, and then notifies the mobile terminal MS1 of the absolute positional information.

The principle of measuring distances from the base stations BS1 and BS2 to the mobile terminal MS1 will be described. The respective base stations BS1 to BS7 are synchronized with each other by GPS, and their service areas have the radii of about 1.5 [km], and divided into 3 sectors of 120 [°] respectively. For instance, FIG. 2 shows such a status that the mobile terminal MS1 is staying in the service areas of the SECT2 of the base station BS1 and the SECT3 of the base station BS2; the distance r1 from the base station BS1 to the mobile terminal MS1 is calculated on the basis of the transmission time and the transmission velocity of a burst signal to be transmitted according to the order of the base station BS1→the mobile terminal MS1→the base station BS1.

Figure 3:
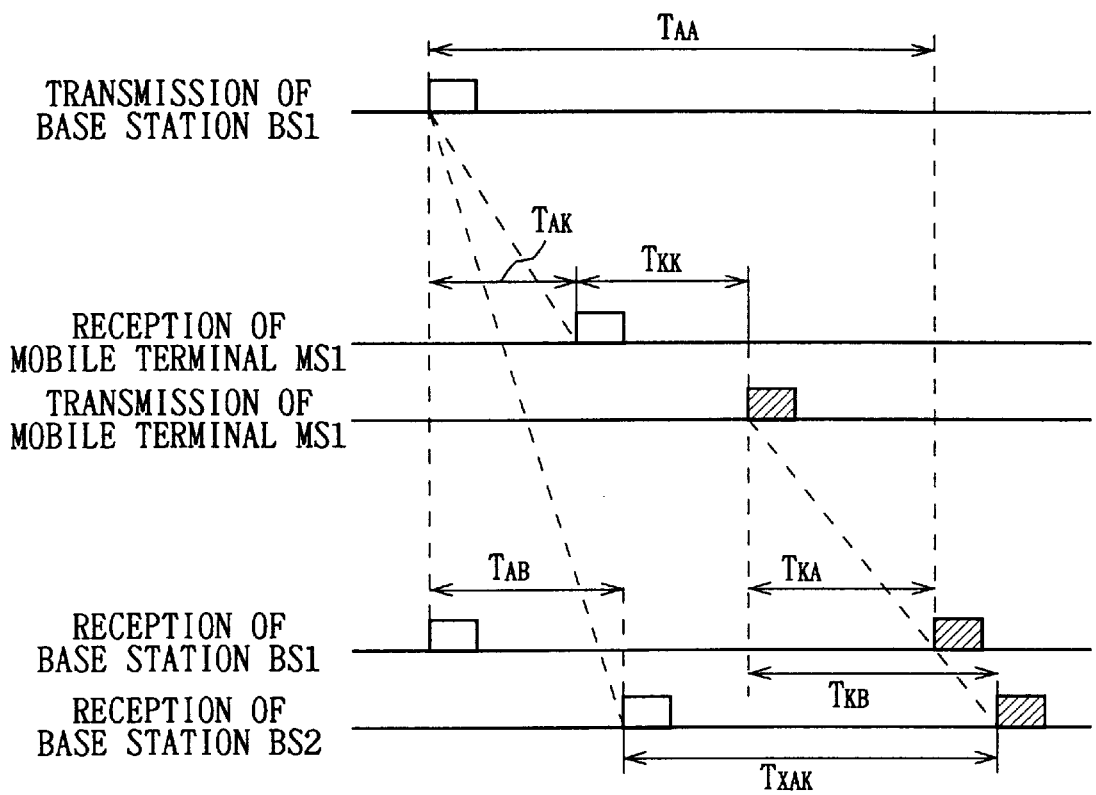
FIG. 3 is a schematic diagram showing the transmission time of a radio wave.

That is, in FIG. 3, assuming that:

$T_{AA}$: time duration from the time at which the base station BS1 transmits a burst signal to the mobile terminal MS1 till the time at which it receives a responsive burst signal from the mobile terminal MS1;

$T_{AK}$: time duration from the time at which the base station BS1 transmits a burst signal till the time at which the mobile terminal MS1 receives the burst signal;

$T_{KK}$: processing time and time for timing synchronization which are required in the mobile terminal MS1; and $T_{KA}$: time duration from the time at which the mobile terminal MS1 transmits a burst signal till the time at which the base station BS1 receives the burst signal, the time $T_{AA}$ is represented by the following equation (1).

$$T_{AA} = T_{AK} + T_{KK} + T_{KA} \qquad (1)$$

In this case, $T_{AK} = T_{KA}$; this means that the transmission time $T_{AK}$, which passes till the time at which the mobile terminal MS1 receives the burst signal sent from the base station BS1, equals to the transmission time $T_{KA}$, which passes between the time at which the mobile terminal MS1 transmits a burst signal and the time at which the base station BS1 receives the burst signal. Therefore, the equation (1) can be deformed into the following equation (2).

$$T_{AA} = 2 \cdot T_{AK} + T_{KK} \qquad (2)$$

Further, the equation (2) can be represented as the following equation (3).

$$T_{AK} = (T_{AA} - T_{KK})/2 \qquad (3)$$

In the equation (3), the time $T_{KK}$ is already known (constant), and the time $T_{AA}$ is being timed by the base station BS1, therefore the base station BS1 can calculate the transmission time $T_{AK}$ on the basis of the equation (3).

Besides, assuming that:

$T_{AB}$: time duration from the time at which the base station BS1 transmits a burst signal till the time at which the base station BS2 receives the burst signal;

$T_{XAK}$: time duration from the time at which the base station BS2 receives a burst signal sent from the base station BS1 till the time at which it receives a burst signal sent from the mobile terminal MS1; and $T_{KB}$: time duration from the time at which the mobile terminal MS1 transmits a burst signal till the time at which the base station BS2 receives the burst signal, the following equation (4) is established.

$$T_{AB} + T_{XAK} = T_{AK} + T_{KK} + T_{KB} \qquad (4)$$

Further, the equation (4) can be rewritten into the following equation (5).

$$T_{KB} = T_{AB} + T_{XAK} - T_{AK} - T_{KK} \qquad (5)$$

In the equation (5), the times $T_{AB}$ and $T_{KK}$ are already known (constant), and the time $T_{AK}$ can be given from the base station BS1 and moreover, the time $T_{XAK}$ is being timed by the base station BS2. Therefore, the base station BS2 can calculate the transmission time $T_{KB}$, which is needed for transmitting to the mobile terminal MS1, on the basis of the equation (5).

That is, by calculating the transmission times $T_{AK}$ and $T_{KB}$ in the base stations BS1 and BS2, the respective distances from the base stations BS1 and BS2 to the mobile terminal MS1 can be obtained. Now, assuming that the transmission velocity and the transmission time of the burst signal are V and $T_{AK}$ respectively, the distance r1 from the base station BS1 to the mobile terminal MS1 is represented by the following equation (6).

$$r1 = V \times T_{AK} \tag{6}$$

Now, assuming that $V=3\times10^8$ [m], and the time $T_{AK}=3$ [µs], the distance r1 becomes 900 [m] in the equation (6). Besides, assuming that the transmission velocity and the transmission time of the burst signal are V and $T_{KB}$ respectively, the distance r2 from the base station BS2 to the mobile terminal MS1 is represented by the following equation (7).

$$r2 = V \times T_{KB} \tag{7}$$

Now, assuming that $V=3\times10^8$ [m] and the time $T_{KB}=2$ [µs], the distance r2 becomes 600 [m] in the equation (7). As described above, in the communication system 1, the distance r1 from the base station BS1 to the mobile terminal MS1 and the distance r2 from the base station BS2 to the mobile terminal MS1 can be calculated.

Figure 4:
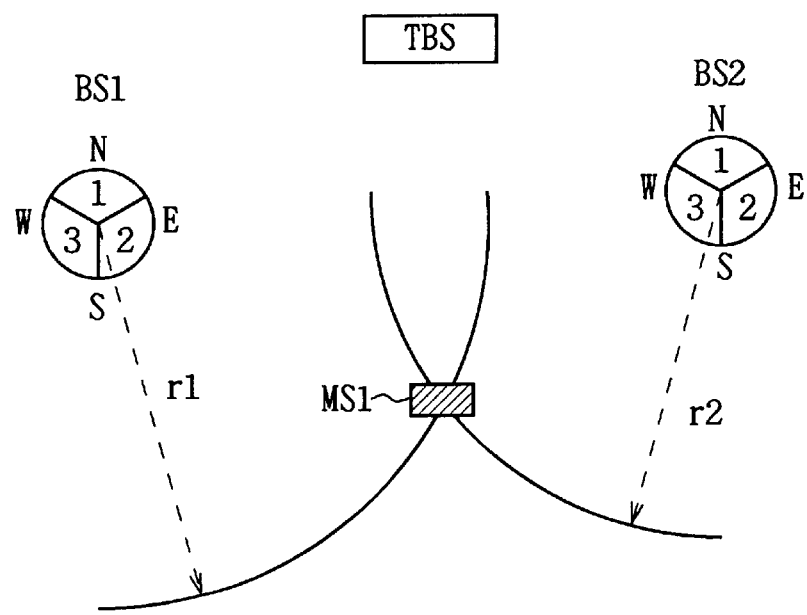
FIG. 4 is a schematic diagram explaining a method of determining the absolute position of the mobile terminal.

Sequentially, as shown in FIG. 4, when the two distances have been calculated, the general administration base station TBS would draw a circle having a radius (r1) of 900 [m] with the base station BS1 as a center, and also draw a circle having a radius (r2) of 600 [m] with the base station BS2 as a center, and then specify the resulted intersecting point as the absolute position of the mobile terminal MS1. In this time, two intersecting points are obtained by the circles of the radius r1 and the radius r2. However, in FIG. 4, the intersecting point existing in the service areas of the SECT2 of the base station BS1 and the SECT3 of the base station BS2 is specified as the absolute position of the mobile terminal MS1. The increase of the number of sectors of the respective base stations can reduce the possibility that two intersecting points exist in the same service area.

Figure 5:
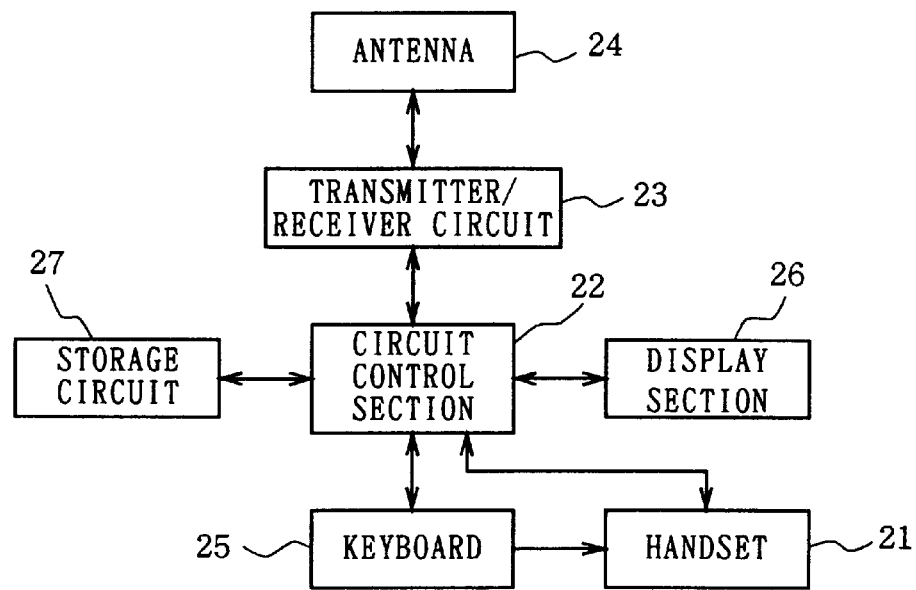
FIG. 5 is a block diagram showing a configuration of the mobile terminal.

Next, FIG. 5 shows a configuration of the circuit of the mobile terminal MS1. At the time of transmission, the mobile terminal MS1 supplies a voice signal which is obtained by a handset 21 to a transmitter/receiver circuit 23 via a circuit control section 22, and then transmits it to the base station BS1 via an antenna 24 as an up transmission signal. Besides, at the time of reception, the mobile terminal MS1 receives a down transmission signal which is delivered from the base station BS1 via the antenna 24, and then supplies the voice signal which is sent from the partner and is taken out by the transmitter/receiver circuit 23, to the handset 21 via the circuit control section 22.

In addition, the mobile terminal MS1 is provided with a keyboard 25 as input means, a display section 26 such as a liquid-crystal display, and a storage circuit 27 comprised of a memory; the keyboard 25 is comprised of a dial key, etc. having a notifying button (not shown) for using at the time of call-out and at the time of notifying the other mobile terminals MS2 and MS3 at once; the display section 26 displays the absolute positional information by means of letters and/or a diagram; and the storage circuit 27 stores the user information such as telephone numbers, address information and map information for specifying the absolute positional information, group ID which is used at the time of registration to the general administration base station TBS, and the like.

Figure 6:
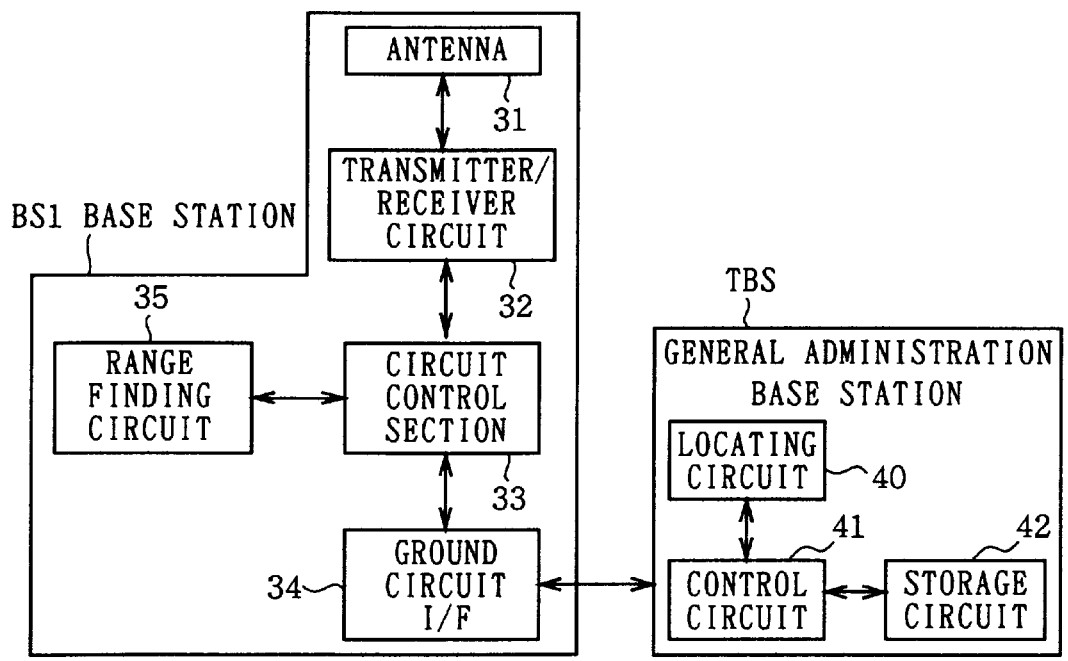
FIG. 6 is a block diagram showing configurations of the base station and the general administration base station.

Next, FIG. 6 shows the configurations of the circuits of the base station BS1 and the general administration base station TBS. In this connection, the base stations BS2 to BS7 are omitted because they have the same configuration as that of the base station BS1. The base station BS1 receives an up transmission signal sent from the mobile terminal MS1 via an antenna 31, takes out a voice signal of the user by using a transmitter/receiver circuit 32, and supplies it to a ground circuit interface 34 via a circuit control section 33. The ground circuit interface 34 transmits the voice signal to the general administration base station TBS with a stated mode.

Besides, the base station BS1 supplies a voice signal of the conversation partner, which has been delivered from the general administration base station TBS via the ground circuit interface 34 and the circuit control section 33, to the transmitter/receiver circuit 32, and then transmits it to the mobile terminal MS1 via the antenna 31 as a down transmission signal. In addition, the base station BS1 has a range finding circuit 35 as distance calculating means, so as to calculate the distance r1 from the base station BS1 to the mobile terminal MS1 based on the transmission velocity V and the transmission time $T_{AK}$ of the burst signal to be transmitted and received between the mobile terminal MS1 and the base station BS1 and then send it to the general administration base station TBS.

When the general administration base station TBS has received the distance information (r1 and r2) to the mobile terminal MS1, from the two or more base stations out of the base stations BS1 to BS7, the general administration base station TBS specifies the intersecting point of the two circles which are drawn based on the distance information by a locating circuit 40, which functions as position determining means, as the absolute position of the mobile terminal MS1, and stores it into a storage circuit 42 via a control circuit 41. In this way, the general administration base station TBS can hold the absolute positional information of all mobile terminals MS1 to MS3 which exist within the cells of the respective base stations BS1 to BS7 into the storage circuit 42.

Figure 7:
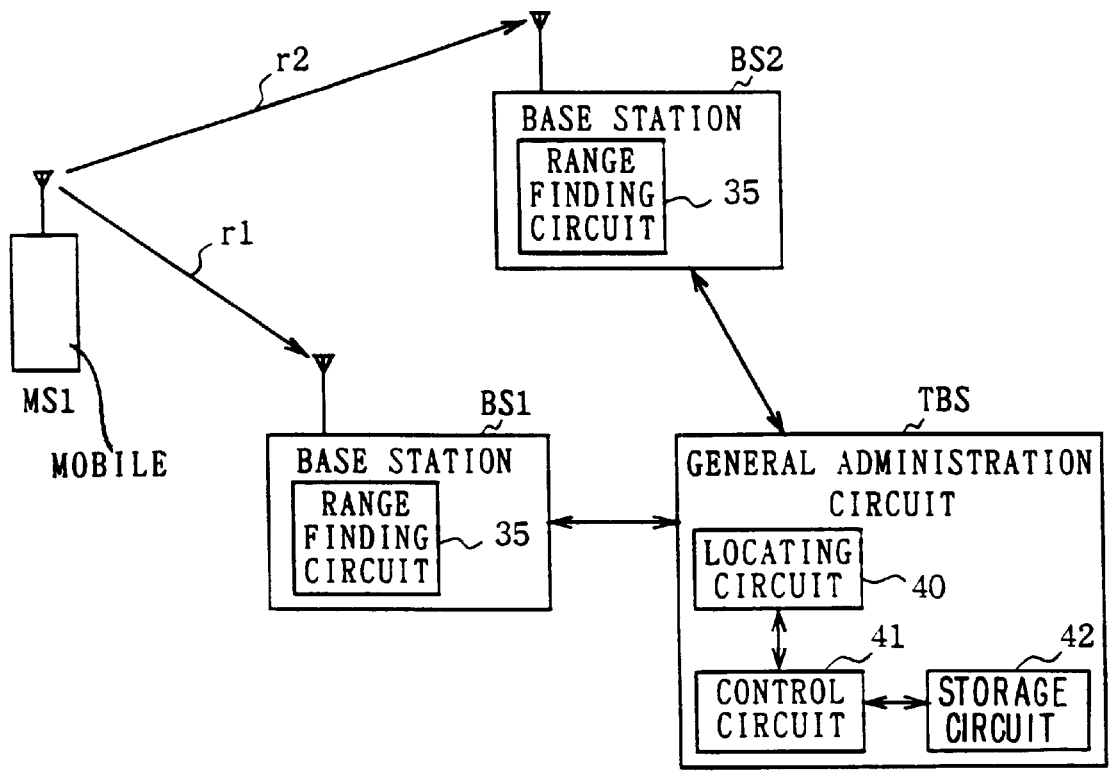
FIG. 7 is a block diagram showing the relationship of the mobile terminal, the base station, and the general administration base station in the communication system.

In fact, as shown in FIG. 7, the base stations BS1 and BS2 calculate the respective distances r1 and r2 from them to the mobile terminal MS1 which exists within their cells C1 and C2, by using the respective range finding circuits 35, and then transmit the results to the general administration base station TBS. Upon receiving the data on the respective distances r1 and r2 from the base stations BS1 and BS2 to the mobile terminal MS1, the general administration base station TBS calculates the intersecting point of the two circles which are drawn based on the distances r1 and r2 by the locating circuit 40 to specify the absolute position of the mobile terminal MS1, and then stores it in the storage circuit 42 which is comprised of a memory, etc. as storage means. In this way, the general administration base station TBS also stores the absolute positional information on the other mobile terminals MS2 and MS3.

Here, the mobile terminal MS1 can require the general administration base station TBS to register the group ID, via the base station BS1 or BS2. The general administration base station TBS registers the group ID of the mobile terminal MS1, and stores it in, for instance, the storage circuit 42. In this case, the group ID is added to accounting information of the mobile terminal MS1, and is allocated to the foremost several bits within the limit of the maximum bit length of the accounting information. As for the other mobile terminals MS2 and MS3 which belong to the circle, the group ID which is common to that of the mobile terminal MS1 can be registered in the general administration base station TBS.

By this, all terminals of the mobile terminals MS1 to MS3 which belong to the specific circle have the common group ID and are registered in the general administration base station TBS. By the way, in the case where the group ID has become unnecessary, the registration can be immediately canceled by requiring the general administration base station TBS to cancel the registration; the group ID can be used among the mobile terminals MS1 to MS3 only during the time it is registered.

Figure 8:
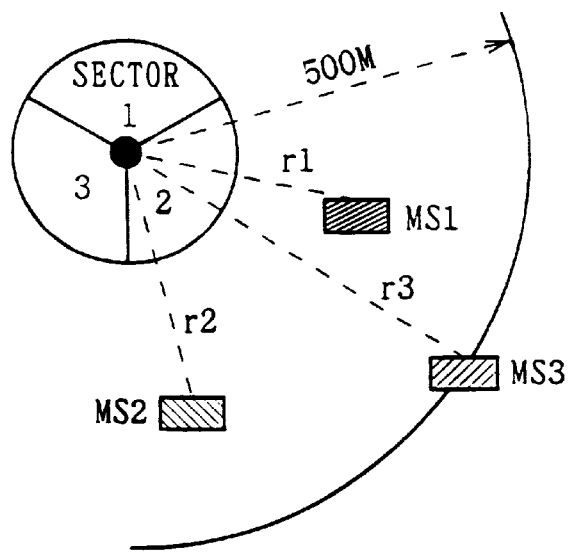
FIG. 8 is a schematic diagram showing the mobile terminals which exist within the scope having a radius of the designated distance.

In fact, as shown in FIG. 8, the mobile terminal MS1 can obtain the information on its own absolute position from the general administration base station TBS via the base station BS1, and also can transmit the request to search whether or not other mobile stations MS2 and MS3 having the same group ID exist within the range of the cell C1 of the base station BS1 and, for instance, within the scope of a radius 500 [m] from the base station BS1, to the general administration base station TBS via the base station BS1. In this case, since the general administration base station TBS, of course, holds the absolute positional information on the other mobile terminals MS2 and MS3, the general administration base station TBS can instantly check by using the control circuit 41 whether or not the mobile terminals MS2 and MS3 have the same group ID as that of the mobile terminal MS1 to judge whether or not they exist.

And, in the case where it has been determined that the mobile terminals MS2 and MS3 having the same group ID as that of the mobile terminal MS1 exist within the scope of a radius 500 [m] of the base station BS1, the general administration base station TBS reads out the telephone numbers of the mobile terminals MS2 and MS3 from the storage circuit 42, and then gives notice of the numbers to the display section 26 of the mobile terminal MS1 via the base station BS1 by using the control circuit 41 which functions as notifying means; if they do not exist, the general administration base station TBS gives notice of the absence as a message. In this way, the user can confirm that the other mobile terminals MS2 and MS3 exist within the designated range scale by confirming the display section 26 of the mobile terminal MS1.

Figure 9:
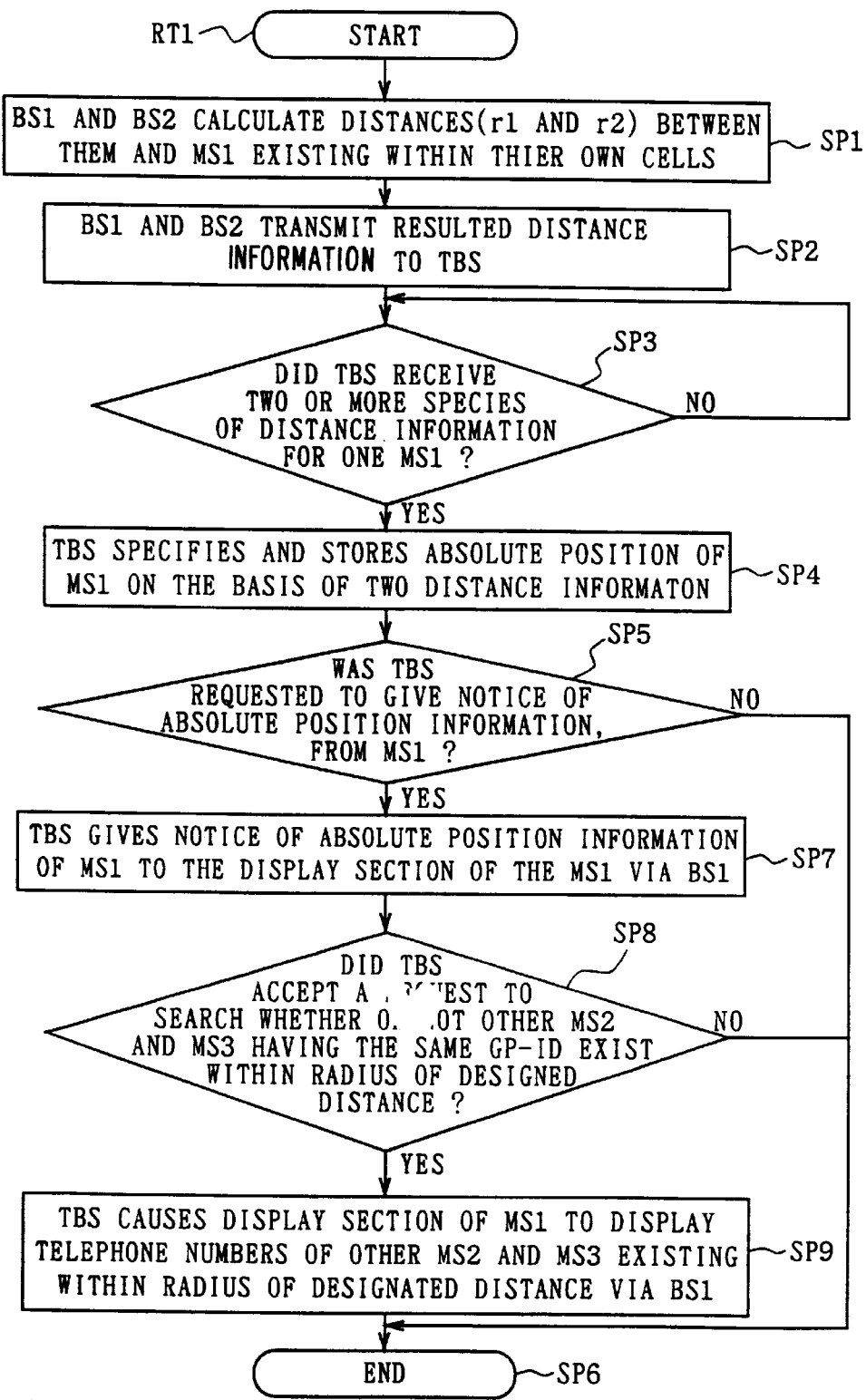
FIG. 9 is a flow chart showing a procedure for giving notice of the absolute positional information of the mobile terminal in the communication system.
Figure 10:
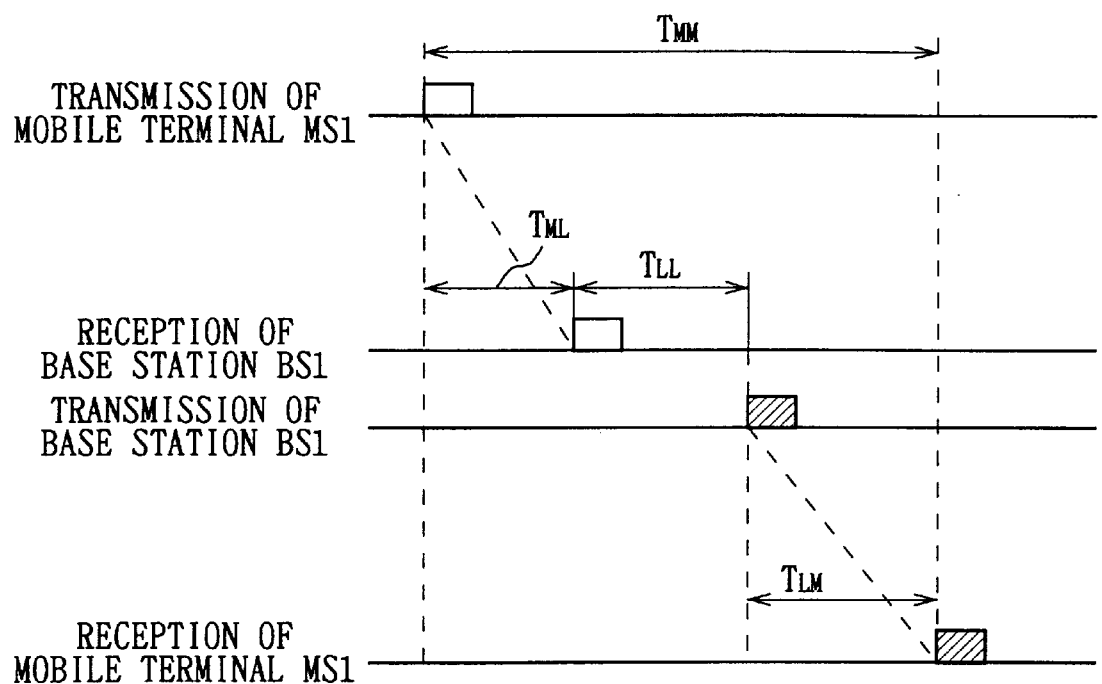
FIG. 10 is a schematic diagram showing the transmission time of radio wave according to the other embodiment.

Next, on the basis of the flow chart of FIG. 9, a processing procedure until the mobile terminal MS1 is notified of the existence of the other mobile terminals MS2 and MS3 within the designated range scale from the general administration base station TBS via the base station BS1 in the communication system 1 will be described.

That is, the procedure starts from step RT1, then proceeds to step SP1, in the communication system 1. At step SP1, the base stations BS1 and BS2 calculate the respective distances (r1 and r2) between them and the mobile terminal, which exists within their own cells, and then proceeds to step SP2. At step SP2, the base stations BS1 and BS2 transmit the resulted distance information (r1 and r2) to the general administration base station TBS, and then proceed to step SP3.

At step SF3, the general administration base station TBS judges whether or not it has received at least two species of distance information concerning one mobile terminal MS1 (from two or more base stations). If the negative result has been obtained, this means that the absolute position of the mobile terminal MS1 can not be specified because two species or more of distance information concerning one mobile terminal MS1 have not been received, so that the general administration base station TBS returns to step SP3 to wait for the reception of two species or more of the distance information. On the contrary, if the positive result has been obtained at step SF3, this means that at least two species of distance information concerning one mobile terminal MS1 have been received, so that the general administration base station TBS proceeds to step SP4.

At step SP41 on the basis of the two species of distance information (r1 and r2) concerning one mobile terminal MS1, the general administration base station TBS specifies and stores the absolute position of the mobile terminal MS1. At step SP5, the general administration base station TBS judges whether or not it has received a request to give notice of the absolute positional information from the mobile terminal MS1 via the base station BS1 or BS2. If a negative result has been obtained, this means that the general administration base station TBS has not received a request for notification from the mobile terminal MS1, so that the communication system 1 proceeds to step SP6 to finish the processing. On the contrary, if a positive result has been obtained at step SP5, this means that it has received the request for notification from the mobile terminal MS1 via the base station BS1 or BS2 (in this case, the base station BS1), so that it proceeds to step SP7.

At step SP7, the general administration base station TBS notifies the display section 26 of the mobile terminal MS1 of the absolute positional information of the mobile terminal MS1, via the base stations BS1, and then proceeds to step SP8. At step SP8, the general administration base station TBS judges whether or not it has received a request to search whether the other mobile terminals MS2 and MS3 having the same group ID exist within the scope of the radius which has been designated with the base station BS1 as a center. If a negative result has been obtained, this means that the general administration base station TBS has not received a request for search from the mobile terminal MS1, so that the communication system 1 proceeds to step SP6 to finish the processing. On the other hand, if a positive result has been obtained at step SP8, this means that the general administration base station TBS has received the request for search from the mobile terminal MS1, so that it proceeds to step SP9.

At step SP9, the general administration base station TBS checks the group ID of all of the other mobile terminals which exist within the scope of the radius having the designated distance, and if it has been determined that the other mobile terminals MS2 and MS3 having the same group ID exist, the general administration base station TBS causes the display section 26 of the mobile terminal MS1 to display the telephone numbers of the mobile terminals MS2 and MS3, and proceeds to step SP10 to finish the processing.

On the above configuration, in the communication system 1, the base stations BS1 and BS2 calculate the respective distance information (r1 and r2) between them and the mobile terminal MS1 which exists within their cells C1 and C2 on the basis of the transmission velocity V and the transmission time $T_{AK}$ (or $T_{KB}$) of the burst signal and transmit it to the general administration base station TBS, and then the locating circuit 40 of the general administration base station TBS draws two circles based on the distance information to calculate the intersecting point of the two circles, so that the absolute position of the mobile terminal MS1 can be specified. Besides, the general administration base station TBS not only stores the specified absolute positional information of the mobile terminal MS1, but also stores the absolute positional information of the other mobile terminals MS2 and MS3, so that it can always hold the absolute positional information of the mobile terminals MS1 to MS3.

Besides, in the communication system 1, when the general administration base station TBS receives the request from the mobile terminal MS1 to give notice of the absolute positional information of the mobile terminal MS1 itself, the general administration base station TBS can give notice of the absolute position to the mobile terminal MS1 via the base station BS1 in the form of written information representing the address and the like because the general administration base station TBS is holding the absolute positional information of the mobile terminal MS1. In this way, the user carrying the mobile terminal MS1 can easily know where he is at present.

Besides, in the communication system 1, since the mobile terminals MS1 to MS3 are registered under the same group ID, the user can know the positional relation between the mobile terminal MS1 which is being carried by the user himself and the other mobile terminals MS2 and MS3. That is, in the communication system 1, the user carrying the mobile terminal MS1 sends a request to search whether the mobile terminals MS2 and MS3 which are being carried by the partners exist within the scope of the radius 500 [m] of the base station BS1, to the general administration base station TBS via the base station BS1.

Since of course the general administration base station TBS is holding the absolute positional information of all mobile terminals which exist within the scope of a radius 500 [m] of the base station BS1, the base station TBS checks if any of mobile terminals have the same group ID as that of the mobile terminal MS1, and when the mobile terminals MS2 and MS3 have the same group ID, gives notice of the telephone numbers of the mobile terminals MS2 and MS3 to the display section 26 of the mobile terminal MS1. Thereby, the user can know that the holders carrying the other mobile terminals MS2 and MS3 exist somewhere within the scope of a radius 500 [m] of the base station BS1 by confirming the telephone numbers given to the display section 26 of the mobile terminal MS1.

Besides, in the communication system 1, the respective distances between the respective base stations BS1 to BS7, which are synchronized with each other, and the respective mobile terminals MS1 to MS3 are calculated on the basis of the transmission velocity V and the transmission time $T_{AK}$ (or $T_{KB}$) of the burst signal, and the general administration base station TBS specifies and stores the absolute positional information of the respective mobile terminals MS1 to MS3. Thereby, the mobile terminals MS1 to MS3 can obtain the absolute positional information from the general administration base station TBS via the base stations BS1 to BS7 at any time, so that the communication system is not enlarged in size in comparison with a locating system which has been combined with GPS, and does not lose the miniaturization and lightweight advantage of the portable telephone unit.

Besides, in contrast with the simplified-type mobile telephone system of which position locating information might have and error of about 100 [m] to 300 [m] with respect to the absolute position, the communication system 1 can search the other mobile terminals MS2 and MS3 which exist within a circle which has a radius of the specified distance with the base station BS1 capable of communicating with the mobile terminal MS1 as a center, so that the communication system 1 can easily perform a high-precision position locating, which has little error, only by shortening the designated distance.

According to the above configuration, since the general administration base station TBS specifies and stores the absolute positional information on the basis of the information of the respective distances between the respective base stations BS1 and BS2 and the mobile terminal MS1, the communication system 1 can immediately notify the mobile terminal MS1 of the accurate positional information in response to the request for notification sent from the mobile terminal MS1.

Note that, in the above embodiment, in the communication system 1, the distance between the base station BS1 and the mobile terminal MS1 is calculated by the range finding circuit 35 of the base station BS1. However, the present invention is not limited thereto and the mobile terminal MS1 can be provided with the range finding circuit 35 and the locating circuit 40 so that the range finding circuit 35 and the locating circuit 40 determine the absolute positional information of the mobile terminal MS1 and transmit the determination result to the general administration base station TBS via the base station BS1 to cause the base station TBS to store it. That is, in FIG. 11, assuming that:

$T_{MM}$: time duration from the time at which the mobile terminal MS1 has transmitted a burst signal to the base station BS1 till the time at which it receives a responsive burst signal from the base station BS1;

$T_{ML}$: time duration from the time at which the mobile terminal MS1 has transmitted a burst signal till the time at which the base station BS1 receives the burst signal;

$T_{LL}$: processing time of the base station BS1; and $T_{LM}$: time duration from the time at which the base station BS1 has transmitted a burst signal till the time at which the mobile terminal MS1 receives the burst signal, the time $T_{MM}$ is represented by the following equation (8).

$$T_{MM}=T_{ML}+T_{LL}+T_{LM} \quad (8)$$

In this case, $T_{ML}=T_{LM}$, this means that the transmission time $T_{ML}$ equals to the transmission time $T_{LM}$. Therefore, the equation (8) can be rewritten into the following equation (9).

$$T_{MM}=2 \cdot T_{ML}+T_{LL} \quad (9)$$

Further, the equation (9) can be represented as the following equation (10).

$$T_{ML}=(T_{MM}-T_{LL})/2 \quad (10)$$

In this equation (10), the time $T_{MM}$ is constant and the time $T_{LL}$ is being timed by the base station BS1, therefore the mobile terminal MS1 can calculate the transmission time $T_{ML}$ on the basis of the equation (10). Therefore, assuming that the transmission velocity and the transmission time of the burst signal are V and T ML respectively, the distance R1 between the mobile terminal MS1 and the base station BS1 is represented by the following equation (11).

$$R1=V \times T_{ML} \quad (11)$$

The distance R2 between the mobile terminal MS1 and the base station BS2 is calculated in the same manner, and then the intersecting point of the two circles which have been drawn with the two distance R1 and R2 as radii are specified as the absolute position of the mobile terminal MS1.

That is, the communication system 1 transmits the absolute positional information of the mobile terminal MS1, which has been measured by the mobile terminal MS1 itself, to the general administration base station TBS via the base station BS1, and causes the base station TBS to store it. By this, the general administration base station TBS can always hold not only the absolute positional information of the mobile terminal MS1 but also the absolute positional information of all of the mobile terminals which exist within the service area. Thus, the general administration base station TBS can obtain the existential information on the other mobile terminals existing within the scope of a circle having a radius of the designated distance, in response to the request sent from the mobile terminal MS1, and in addition, can notifies the other mobile terminals of the absolute positional information of the mobile terminal MS1 itself at once.

Further, in the above embodiment, the general administration base station TBS checks whether or not other mobile terminals MS2 and MS3 having the same group ID exist within the scope of the circle which has a radius of the designated distance with the base station BS1 (or BS2) as a center, and then notifies the mobile terminal MS1 of the search result. However, the present invention is not limited thereto and the scope of the circle not with the base station BS1 as a center but with the mobile terminal MS1 itself as a center can be applied. By this, even if the mobile terminal MS1 does not correctly know the position of the base station BS1, it can know, more correctly, the positions of the other mobile terminals which exist within the scope of the circle with the mobile terminal itself as a center, by shortening the designated distance.

Furthermore, in the above embodiment, the mobile terminal MS1 is notified from the general administration base station TBS of whether or not the other mobile terminals MS2 and MS3 having the same group ID exist within the scope of a radius 500 [m] of the base station BS1. However, the present invention is not limited thereto and after confirming the telephone numbers of the other mobile terminals MS2 and MS3 which have been displayed on the display section 26, a general notice request can be transmitted to the general administration base station TBS for notifying the desired partner (for instance, only the mobile terminal MS2) of the absolute positional information of the mobile terminal MS1 via the circuit control section 22 as control means, thereby causing the display section of the mobile terminal MS2 to display the absolute positional information of the mobile terminal MS1.

In practice, the user having the mobile terminal MS1 designates the telephone number of the partner and pushes down the general notice button (not shown) installed on the keyboard 25, in order to transmit the general notice request for performing a general notification of the absolute positional information of the mobile terminal itself toward the other mobile terminal MS2 having the same group ID, to the general administration base station TBS. Thereby, the general administration base station TBS can give notice of the absolute positional information of the mobile terminal MS1 to the display section 26 of the mobile terminal MS2 having the same group ID, via the base station BS1, as in the form of letter information such as the address, in response to the general notice request sent from the mobile terminal MS1.

In this way, by confirming the letter information (address or the proper noun such as the name of a store) displayed on the display section 26, the holder of the mobile terminal MS2 can know the absolute positional information of the mobile terminal MS1. Then, the holder of the mobile terminal MS2 requests the general administration base station TBS, via the base station BS1, to transmit a response signal representing that the sent letter information have been confirmed. On the basis of this request, the general administration base station TBS transmits the response signal sent from the mobile terminal MS2, to the mobile terminal MS1 via the base station BS1.

In this way, by confirming that the mobile terminal MS1 has received the response signal sent from the mobile terminal MS2, the user can confirm that the other mobile terminal MS2 has surely received the absolute positional information of his own terminal. Thereafter, it is needed to only wait for the arrival of the holder of the mobile terminal MS2 at the position of which absolute positional information has been sent at once by the user, and it is able to eliminate a waste of time which is caused by a mistake of the appointed place for meeting. As described above, the communication system 1 can give notice of the absolute positional information of the mobile terminal MS1 at once toward the other mobile terminals MS2 and/or MS3 having the same group ID in real time, and also can surely perform communication of the information by receiving the response signal sent from the mobile terminals MS2 and/or MS3 and performing two-way communications. Thus, even though it is under the state of emergency such as an ambulance, a fire, and a crime wherein conversation is disabled, the side which has accepted the notification of the absolute positional information of the mobile terminal MS1 can quickly cope with the situation.

Further, in the above embodiment, the absolute positional information of the mobile terminal MS1 is displayed on the display section 26 in the form of written letter information such as the address. However, the present invention is not limited thereto and charts such as maps can be displayed on the display section 26, by storing them in the storage circuit 27 previously, in order to mark or blink at the current position of the mobile terminal MS1 during displaying.

Further, in the above embodiment, the group ID, which is an identification code, is added to the accounting information within the limits of the maximum bit length. However, the present invention is not limited thereto and the group ID can be added to the other various signals, such as a mobile unit identifier having variable-length structure which uses extension bits.

Further, in the above embodiment, the burst signal is utilized as a transmission signal. However, the present invention is not limited thereto and other various signals such as a spread spectrum signal can be utilized as long as the transmission velocity is always constant and distances (r1 and r2) to the mobile terminal MS1 can be accurately calculated.

Further, in the above embodiment, the communication system 1 of the present invention is applied to a digital cellular system of CDMA system. However, the present invention is not limited thereto and the communication system can be applied to a digital cellular system according to the other system, such as time division multiple access (TDMA) system.

According to the present invention as described above, in the communication system comprised of at least two base stations which are synchronized with each other, a control station for performing general administration of the base stations, and mobile stations, a base station comprises distance calculating means for calculating a distance between the base station and a mobile station, on the basis of a transmission velocity and a transmission time of a transmission signal which is transmitted/received between the base station and the mobile station, and the control station comprises position determining means for determining the absolute position of the mobile station, on the basis of the first and the second distances which are obtained from the two or more base stations, and notifying means for examining whether or not any other mobile station having the same identification code exists within a range scale which has been designated by the mobile station, and for giving notice of the search result to the mobile station via the base station. Thereby, a communication system can be realized, wherein the mobile station can easily recognize existence of other mobile stations having the same identification code, on the basis of the search result.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A mobile communication system including plural base stations synchronized with each other, a control station for performing general administration of the plural base stations, and plural mobile stations, each of said plural base stations comprising:

distance calculating means for calculating distances between the base station and respective mobile stations, on a basis of signal transmission velocities and signal transmission times which are obtained by communicating with said respective mobile stations;

transmitting means for transmitting the calculated distances to said control station, and said control station comprising:

position determining means for determining positions of said respective mobile station, on a basis of the distances between said respective base stations and said respective mobile stations, which are transmitted by said plural base stations to said control station;

storage means for storing a same identification code for specific ones of said mobile stations out of said plural mobile stations; and notifying means for determining whether any other mobile station having said same identification code exists within a range scale designated by one of said specific ones of said plural mobile stations, and for providing a result of the determination to said one of plural mobile stations via one of said base stations, wherein said notifying means, if other mobile stations having the same identification code exist within said range scale, provides positional information of said one of said specific ones of said plural mobile stations to the remaining mobile stations of said specific plural mobile stations.

2. The mobile communication system according to claim 1, wherein said range scale designated by said one of specific plural mobile stations is designated with said one of specific plural mobile station as a center.

3. The mobile communication system according to claim 1, wherein said range scale designated by said one of specific plural mobile stations is designated with a base station which said one of specific plural mobile stations communicates with as a center.

4. The mobile communication system according to claim 1, wherein said notifying means, if other mobile stations having the same identification code exist within said range scale, provides telephone numbers of said other mobile stations as said determination result.

5. A mobile communication system comprised of plural base stations synchronized with each other, a control station for performing general administration of the plural base stations, and plural mobile stations, each of said mobile stations comprising:

distance calculating means for calculating distances between the mobile station and respective base stations, on a basis of signal transmission velocities and signal transmission times which are obtained by communicating with said respective base stations; and position determining means for determining a position of the mobile station, on a basis of calculated distances between the mobile station and said respective base stations, and said control station comprising:

first storage means for storing absolute positions of said respective plural mobile stations, which are sent from said plural mobile stations; and storage means for storing a same identification code for specific ones of said mobile stations out of said plural mobile stations; and notifying means for determining whether any other mobile station having the same identification code exists within a range scale designated by one of said specific ones of said plural mobile stations, and for providing a result of the determination to said one of said specific plural mobile stations via one of said base stations, wherein said notifying means, if other mobile stations having said same identification code exist within said range scale, provides positional information of said one of said specific plural mobile stations to the remaining mobile stations of said specific plural mobile stations.

6. The mobile communication system according to claim 5, wherein said range scale designated by said one of specific plural mobile stations is designated with said one of specific plural mobile stations as a center.

7. The mobile communication system according to claim 5, wherein said range scale designated by said one of specific plural mobile stations is designated with a base station which said one of specific plural mobile stations communicates with as a center.

8. The mobile communication system according to claim 5, wherein said notifying means, if other mobile stations having said same identification code exist within said range scale, provides telephone numbers of said other mobile stations as the determination result.

9. A mobile terminal in a mobile communication system with plural base stations synchronized with each other, which determine distances to respective mobile terminals, and a control station which performs general administration of the base stations, determines positions of respective mobile terminals based on the determined distances, sent from the plural base stations, to the respective mobile terminals, and stores a same identification code for specific plural mobile terminals including said mobile terminal, said mobile terminal comprising:

transmitting/receiving means for communicating with a base station;

input means for designating a desired range scale; and display means for displaying information of other mobile terminals having said same identification code existing within said desired range scale, which has been received by said transmitting/receiving means from said control station via one of said base stations, wherein said information of other mobile terminals which is displayed by said display means is positional information.

10. The mobile terminal according to claim 9, wherein
said range scale to be designated by said input means is designated with said mobile terminal as a center.

11. The mobile terminal according to claim 9, wherein
said range scale to be designated by said input means is designated with a base station which said mobile terminal communicates with as a center.

12. The mobile terminal according to claim 9, wherein
said information of other mobile terminals which is displayed by said display means is telephone number information.

13. A mobile terminal in a mobile communication system with plural base stations synchronized with each other, which determine distances to respective mobile terminals, and a control station which performs general administration of the base stations, determines positions of respective mobile terminals based on distances, sent from the plural base stations, to the respective mobile terminals, and stores a same identification code for specific plural mobile terminals including said mobile terminal, said mobile terminal comprising:

transmitting/receiving means for communicating with a base station;

distance calculating means for calculating distances between said mobile terminal and respective base stations, based on signal transmission velocities and signal transmission times which are obtained by communicating with said respective based stations;

position determining means for determining a position of said mobile terminal based on the calculated distances between said mobile terminal and said respective base stations;

input means for designating a desired range scale; and display means for displaying information of other mobile terminals having said same identification code existing within said desired range scale, which has been received by said transmitting/receiving means from said control station via one of said base stations, wherein said information of other mobile terminals which is displayed by said display means is positional information.

14. The mobile terminal according to claim 13, wherein
said range scale to be designated by said input means is designated with said mobile terminal as a center.

15. The mobile terminal according to claim 13, wherein
said range scale to be designated by said input means is designated with a base station which said mobile terminal communicates with as a center.

16. The mobile terminal according to claim 13, wherein
said information of other mobile terminals which is displayed by said display means is telephone number information.

* * * * *